(12) United States Patent
Brown et al.

(10) Patent No.: US 7,103,784 B1
(45) Date of Patent: Sep. 5, 2006

(54) GROUP TYPES FOR ADMINISTRATION OF NETWORKS

(75) Inventors: Mark R. Brown, Seattle, WA (US); Murli Satagopan, Bellevue, WA (US); Dave Detlef Staube, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,083

(22) Filed: May 5, 2000

(51) Int. Cl.
*G06F 12/00* (2006.01)

(52) U.S. Cl. .................. 713/201; 713/185; 713/151

(58) Field of Classification Search ......... 713/182–186, 713/200, 202, 150–154, 168–173

See application file for complete search history.

(56) References Cited

U.S. PATENT DOCUMENTS 6,643,783 B1 * 11/2003 Flyntz .................... 713/201
6,651,168 B1 * 11/2003 Kao et al. ................ 713/185
6,651,175 B1 * 11/2003 Slama .................... 713/201

OTHER PUBLICATIONS

Lee et al., Designing a virtual access control configuration protocol for implementation over ISDN and shared–media networks, Local Computer Networks, 1996, Poceedings 21st IEEE Conference on, 13–16 Oct. 1996, pp. 116–125. 13–16*

McCullough, Security analysis of a token ring using Ulysses, Computer Assurance, 1989, COMPASS '89, 'Systems Integrity, Software Safety and Processs Security', Proceedings of the Fourth Annual Conference on 19–23 Jun. 1989 pp. 113–118.*

Cooke et al., Crypotographic algorithms and protocols for personal communication systems security, Security and Cryptography Applications to Radio Systems, IEE Colloquium on, 1994, pp. 8/1—8/6.*

(Continued)

*Primary Examiner*—David Jung
(74) *Attorney, Agent, or Firm*—Workman Nydegger (57) ABSTRACT

An improved system and method for network management is presented which facilitates better administration with a more intuitive reflection of the organizational structure with integrated security concerns by introducing novel strategies for grouping users of a network. In particular, a new group, the Universal Group, is introduced to facilitate nested groups with members in more than one Domain. Members of a universal group may be allowed access to resources across Domain boundaries, where Domains reflect a security boundary in the Network. In addition, the nesting of groups, e.g., within Universal Groups, is enabled, subject to some restrictions, in order to reduce the overhead associated with discovering the groups to which a user belongs. Furthermore, allowing a group to include members without security clearance, but restricting the groups listed on an access token corresponding to a user to groups to which the user has security clearance/authorizarion allows flexible management of groups having similar memberships but different security attributes.

37 Claims, 3 Drawing Sheets

OTHER PUBLICATIONS

CredEx: user–centric credential management for grid and Web services; Del Vecchio et al; Web Services, 2005. ICWS 2005. Proceedings. 2005 IEEE International Conference on Nov. 15 Jul. 2005 pp. 149–156 vol. 1.*

The Saga Security System: a security architecture for open distributed systems; Soshi, M.; Maekawa, M.; Distributed Computing Systems, 1997., Proceedings of the Sixth IEEE Computer Society Workshop on Future Trends of Oct. 29–31 1997 pp. 53–58.*

Assigning cryptographic keys to access control in a multi–attribute hierarchy; Guan et al.; Security Technology, 2003. Proceedings IEEE 37th Annual 2003 International Carnahan Conference on Oct. 14–16, 2003 pp. 337–340.* www.winnetmag.com/Articles/Print.cfm?ArticleID+289.*

"Managing Windows NT Server Domains", pp. 1–35, retrieved from "http://Microsoft.com/technet/prodtechnol/winntas/proddocs/concept/xcp0.1.asp?fram."Jan. 29, 2004.

"Microsoft Exchange Server Directory Integration with the Microsoft Windows 2000 Active Directory," Microsoft Corporation, Sep. 1997, pp.–22, retrieved from mk@MSITStore:C/Program%20Files/Microsoft%20Vi.../exchange$_{13}$and$_{13}$active$_{13}$directory ht.

"Chapter 2 –Working with User and Group Accounts", pp. 1–34, retrieved from "http//technet.Microsoft.com/cdonli...t/winntas/manuals/concept/xcp02.htm"Nov. 11, 1999.

Mark Brown, Murli Santagopan, Andy Harjanto "NT 5.0 Directory Service", Group, pp. 1–20, V 0.1, Monday, Dec. 1, 1997,retrieved from C:/Windows/TEMP/126631.1–Group Types for Access Control and Distributioin Lists.doc, Aug. 27, 1999.

"Microsoft Windows 2000 Active Directory Technical Summary", Aug. 1998, pp. 1–23, retrieved from mk:@MSITStore:c:/Program%20Files/Microsoft%20Visual%20Studio/./sdn$_{13}$actdsum.ht Dec. 28, 1999.

* cited by examiner

GROUP TYPES FOR ADMINISTRATION OF NETWORKS

TECHNICAL FIELD

This invention relates generally to network administration, and more particularly to the administration of an intra-organizational network with a large number of user nodes that may be organized in domains defined by security considerations.

BACKGROUND OF THE INVENTION

Various networking strategies are used in modern computer networks to enable intra-organizational communication while attempting to accommodate security concerns about preventing unauthorized access to information. Such communications range from unencrypted E-mails to encrypted secure documents that should be accessible to only a subset of users having the privilege to use the intra-organizational network. The extent of such a network could be global in geographical terms and may include local high-speed connections along with, possibly, slow linkages to far-flung nodes.

It is desirable in course of implementing networks to maximize authorized access without generating excessive network traffic due to the associated overhead. This overhead typically includes, among other things, maintaining a record of users authorized to access a particular network accessible resource and frequently updating such records. In a simple case, each resource maintains its own list of authorized users, and upon receiving a request for service checks the list to prevent security breaches due to access by unauthorized users.

Users of a network are often organized into groups. The use of groups reduces the number of list entries that have to be checked by a resource (and updated by the system) prior to granting access to a requestor because many users may belong to a group, and thus proof of a user's membership in an approved group could suffice. Such proof may be provided by presenting an "access token" that lists all of the security groups to which a particular user belongs. Additionally, administrators have to manage only one account for each user, and each user typically needs to use (and remember the password of) only one account to access resources in a domain. Thus, an effective grouping strategy should reflect the security structure of the network and the organizational dynamics of the group members.

An illustrative example of such existing networking strategies is provided by the "Windows NT 4.0" software provided by "Microsoft®," which is described next in some detail in order to provide a suitable background for the enhancements introduced in this application. In keeping with the preceding description, the "Windows NT 4.0" software envisages a logical grouping of network servers and other computers that share common security and user account information as a "domain." Within domains, administrators usually create one user account for each user. Users then log on to the domain rather than repeatedly logging on to various individual servers in the domain. A domain is simply an administrative unit of Windows NT Server Directory Services corresponding to a security boundary. Thus, computers in a single domain can share physical proximity on a small local area network (LAN) or can be located in different parts of the world and communicate over various types of physical connections, including dial-up lines, ISDN, fiber, Ethernet, Token Ring, frame relay, satellite, and leased lines etc.

Within a domain, "domain controllers" manage all aspects of user-domain interactions. Domain controllers are computers running "Windows NT®" Server that share one directory database to store security and user account information for the entire domain. The domain controllers in each domain form a single administrative unit and use the information in the directory database to authenticate users logging on to domain accounts. Each domain has one primary domain controller (PDC), which tracks changes made to domain accounts. Whenever an administrator makes a change to a domain account, the change is recorded in the directory database on the PDC, which is the only domain server that receives these changes directly.

In addition, multiple backup domain controllers (BDCs) can exist in a domain. A BDC maintains a copy of the directory database. This copy is synchronized periodically and automatically with the PDC. BDCs also authenticate user logons, and a BDC can be promoted to function as the PDC.

An individual may use domain resources such as files, directories, and printers if he or she has a user account created by an administrator, who assigns a user name to an account, specifies the user's identification data, and defines the user's rights on the system. Resources in the domain are available subject to user rights, privileges and system-wide policies. Advantageously, there are predefined (built-in) groups with sets of user rights already assigned. Administrators, then, can assign user rights by adding a user account to one of the predefined groups or by creating a new group and assigning specific user rights to that group. Users who are subsequently added to a group automatically gain all user rights assigned to the group account. Although, individual users can be given specific user rights, most administrators prefer to control actions on a group basis rather than on an individual user basis.

In contrast to "rights," which are domain wide and defined in relation to the domain controller, "permissions" are rules that regulate which users can use objects (such as directories, files, and printers) and in what manner. The owner of an object sets the permissions on the object. Similar to user rights, a permission on an object applies to each member of a group if the group is granted the permission on the object. Under some circumstances a user may have a right but not the permission necessary to exercise the right. Often the right trumps the conflicting permission in such a situation.

Although small organizations can store accounts and resources in a single domain, large organizations typically establish multiple domains. Multiple domains with appropriate group definitions can advantageously allow an organization to manage far flung operations with reduced administrative overhead in course of doing business. A natural concern from a business and privacy perspective is security in the context of large networks. Often, security across multiple domains is provided through trust relationships. A trust relationship is a link that allows users authenticated in one domain to access resources in another domain, subject to access control.

Two types of trust relationships are encountered in most networks. In a one-way trust relationship, one domain trusts the users in the other domain to use its resources. More specifically, one domain trusts the domain controllers in the other domain to validate user accounts to use its resources. The resources that become available are in the trusting domain, and the accounts that can use them are in the trusted domain. However, if user accounts located in the trusting domain need to use resources located in the trusted domain, that situation requires a two-way trust relationship.

A two-way trust relationship is two one-way trust relationships in that each domain trusts user accounts in the other domain. Users can log on from computers in either domain to the domain that contains their account. Each domain can have both accounts and resources. Global user accounts and global groups can be used from either domain to grant rights and permissions to resources in either domain. In other words, both domains are trusted domains.

Two types of group accounts are supported in "Microsoft®" "Windows NT 4.0" software. A "global group" consists of several user accounts from only a single domain—the domain where the global group was created, that are grouped together under one group account name. "Global" indicates that the group can be granted rights and permissions to use resources in multiple (global) domains. A global group can contain only user accounts and can be created only on a domain controller and not on a workstation or member server.

In contrast, a "local group" consists of user accounts and global groups from one or more domains, grouped together under one account name. Users and global groups from outside a particular domain can be added to the local group only if they belong to a trusted domain. "Local" indicates that the group can be granted rights and permissions to use resources in only a single (local) domain. A local group can contain users and global groups, but it cannot contain other local groups. It is useful to note that global groups are an efficient way to add users to a local group. Although a global group can be granted permissions and rights in its own domain, it is best to grant rights and permissions to local groups and use global groups to add user accounts from account domains (trusted) to resource domains (trusting). Usually "Windows NT" domain controllers also support built-in local groups having rights corresponding to the built-in group names such as Administrators, Account Operators, Server Operators, Backup Operators, Print Operators, Users, Guests, and Replicators.

Member servers can participate in a domain, although participation is not required. Permissions can be set on the server's resources that allow users to connect to the server and use resources. It should be noted that a member server that does not participate in a domain has only its own database of users, and it processes logon requests by itself. It does not share account information with any other computer and cannot provide access to domain accounts. Only user accounts created at the server can be logged on to or given rights and permissions for using the server's resources.

SUMMARY OF THE INVENTION

The difficulties presented by the limiting group definitions and the efficiency considerations due to network traffic generated by the need to verify access privileges are overcome by the invention in addition to presenting a method and system for better administering computer networks, including heterogenous networks spanning great geographical distances, that include resources that are not accessible to all users. A Universal Group, which has members belonging to different domains and which may use resources across domain boundaries is used to better organize users into groups. In addition, nesting of groups, e.g., within Universal Groups, is enabled subject to some restrictions in order to reduce the overhead associated with discovering the groups to which a user belongs. Furthermore, allowing a group to include members without security clearance, but restricting the groups listed on an access token to groups to which the user has security clearence/authorizarion allows flexible management of groups having similar properties but for the different security attributes. This translates into reduced network traffic due to less extensive replication requirements as well as facilitating better administration of the network by allowing groups that better reflect actual organizational relationships.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention teaches an efficient method of structuring groups of objects for security purposes in a distributed computing system, and a method of unifying such groups with groups used for distributing email.

The invention addresses two problems encountered presently. First, in a distributed system it is advantageous to perform access control at the granularity of sets of users rather than user-by-user. This leads to the concept of a security group. Groups gain power and flexibility by allowing nesting, e.g. group A being a member of group B implies that all members of group A are effectively members of group B. However, in a distributed system it is impractical to allow arbitrary nesting of groups, because doing so makes answering the question "does this user belong to this group?" which is a basic question that must be answered to perform access control to files and other network resources, quite expensive. In accordance with the invention, a set of rules for restricted nesting of groups is provided that allows the system to model real organizations (in which group memberships must cut across organizational, network, and other boundaries) yet allows the question "does this user belong to this group?" to be answered efficiently.

Second, E-mail is a common distributed system application that also needs to define sets of users and distribution lists. When you send mail to a distribution list you send it to all members of the list. In accordance with a feature of the invention, a unification of distribution lists with security groups allows the maximum commonality both in the system that represents groups and in the administrative tools that manipulate groups. Furthermore, there is a specific innovation that provides the customer with control over the usage of unified groups. Accordingly, a group can be defined as "not for security", which eliminates any negative performance impact of this group on the security system. Distribution lists are often defined "not for security." Yet the option of defining a distribution list "for security" is retained, in which case the group serves a dual purpose.

In accordance with the invention there are provided definitions for three mutually exclusive group types, and an orthogonal "security-enabled" attribute on groups, thus generating six types of groups in all; a definitions of restrictions on membership and usage of groups of the various types; and a definition of an algorithm that computes the access token of a security principal.

Some of the relevant terms are defined next for the sake of clarity. A resource is a process in a distributed computing system. Examples of resources include directory services, file systems, and database management systems. An object, in this context, is a directory service entry. A security principal is an object representing an entity or set of entities that may have access rights to a resource. A user is a security principal corresponding to an individual. A group is a security principal corresponding to a set of individuals. A contact is an object corresponding to an individual who is not a security principal. Typically the individual represented by a contact can receive e-mail. But because the contact is not a security principal the individual represented by a contact cannot access resources.

In a similar vein, an access token is a data structure associated with a user attempting to access a resource. The access token contains the user's identity and the identity of groups containing the user. A domain is a security boundary in a distributed system. Each user and each resource is associated with a specific domain. A directory service object within that domain represents the user or resource. When a user attempts to access a resource, designated machines within the user's domain, called domain controllers, are responsible for authenticating (establishing the identity of) the user. Domain controllers within both the user's and the resource's domain cooperate to compute the user's access token at a resource. The resource itself then makes a yes/no access decision based on the contents of the access token, the type of access (e.g. read or write) requested by the user, and the state of the resource.

THE GROUP TYPES

In an embodiment of the invention each group has an integer groupType attribute. The possible values of group-Type are defined by these bit flags:

ADS_GROUP_TYPE_GLOBAL_GROUP
ADS_GROUP_TYPE_DOMAIN_LOCAL_GROUP
ADS_GROUP_TYPE_UNIVERSAL_GROUP
ADS_GROUP_TYPE_SECURITY_ENABLED

Figure 1:
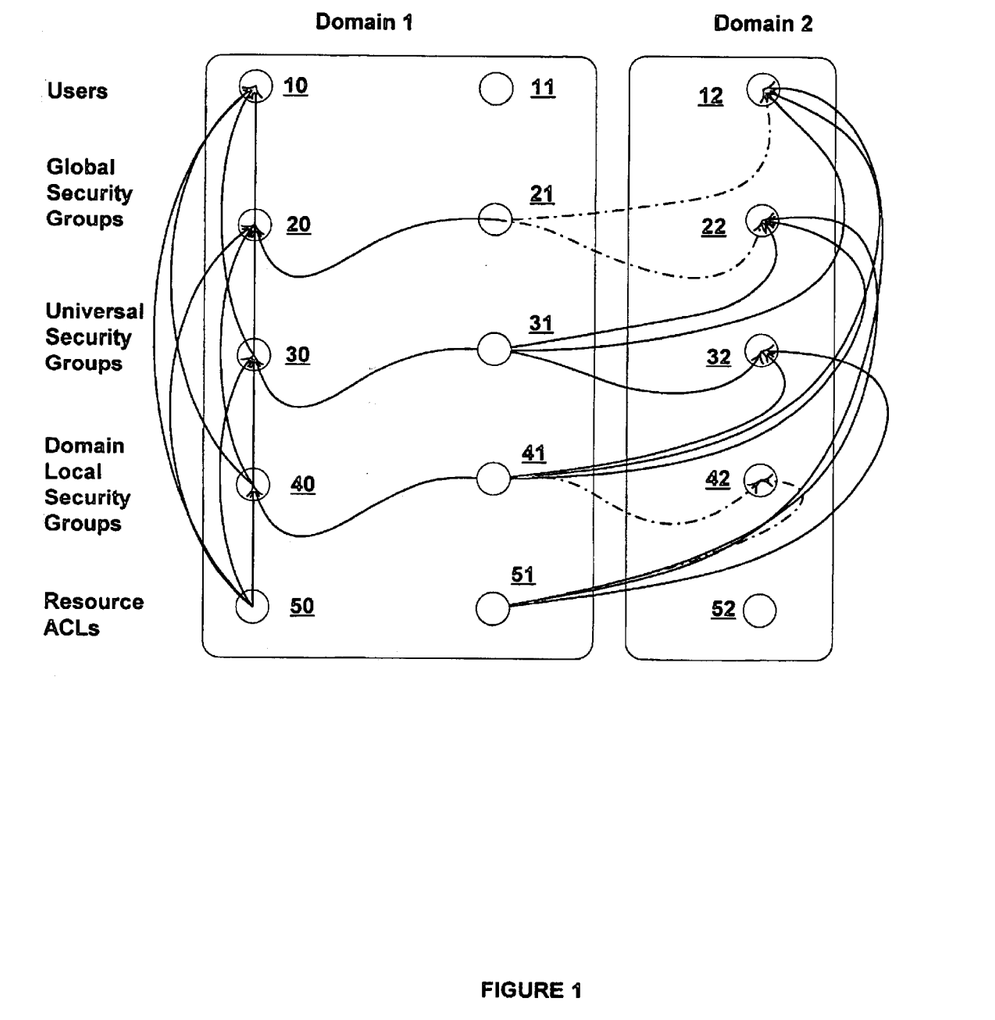
FIG. 1 is a block diagram generally illustrating the relationships between various security enabled groups in accordance with the invention.

Exactly one of the first three flags must be present. The fourth flag is orthogonal to the first three. As illustrated in FIG. 1, there are six legal combinations:

global security group: ADS_GROUP_TYPE_GLOBAL_GROUP & ADS_GROUP_TYPE_SECURITY_ENABLED domain local security group: ADS_GROUP_TYPE_DOMAIN_LOCAL_GROUP & ADS_GROUP_TYPE_SECURITY_ENABLED universal security group: ADS_GROUP_TYPE_UNIVERSAL_GROUP & ADS_GROUP_TYPE_SECURITY_ENABLED global distribution group: ADS_GROUP_TYPE_GLOBAL_GROUP domain local distribution group: ADS_GROUP_TYPE_DOMAIN_LOCAL_GROUP universal distribution group: ADS_GROUP_TYPE_UNIVERSAL_GROUP For some purposes the ADS_GROUP_TYPE_SECURITY_ENABLED bit is irrelevant. Therefore it is convenient to use the term global group to mean global security group or global distribution group, domain local group to mean domain local security group or domain local distribution group, and universal group to mean universal security group or universal distribution group.

RESTRICTIONS ON GROUP MEMBERSHIP AND USAGE

The system imposes the following restrictions on group membership and usage:

Objects from a domain cannot be contained in a global group from another domain.

A universal group cannot be contained in a global group.

A domain local group cannot be contained in groups, except for domain local groups in the same domain.

A domain local group cannot be used to control access to a resource in another domain.

Consequences of these restrictions include:

Global groups can't contain users, contacts, or global groups from other domains. Global groups can't contain universal groups. Global groups can't contain domain local groups.

Universal groups can't contain domain local groups.

Domain local groups can't contain domain local groups from other domains.

A resource can't be access-controlled using domain local groups from other domains.

COMPUTING THE ACCESS TOKEN

The access token is computed in four stages. The first two stages are performed by a domain controller from the user's domain. The third stage might be performed on a domain controller of either domain. The fourth stage is performed by a domain controller of the resource's domain.

The four stages or steps are as follows:

1. The user is added to the access token.
2. All global security groups from the user's domain that contain any object in the access token are added to the access token. This step is repeated until no more global security groups are added on some iteration.

3. All universal security groups from any domain that contain any object in the access token are added to the access token. This step is repeated until no more universal security groups are added on some iteration.

4. All domain local security groups from the resource's domain that contain any object in the access token are added to the access token. This step is repeated until no more domain local security groups are added on some iteration.

At this point the access token is complete.

The restrictions on the various group types relate directly to this algorithm. For instance, if a global security group were allowed to contain a universal security group, the system administrator would expect that global group and any global groups containing it to be added to the access token when the universal group is added. The algorithm above does not do this, because it would be hopelessly inefficient. Therefore the system restricts groups to structures that are consistent with the token construction algorithm. Requests to create and modify groups enter the Directory Services Agent (DSA.) The DSA passes these requests to the Security Accounts Manager (SAM) for validation. SAM enforces the group type restrictions.

FIG. 1 summarizes these relationships between group types described above. In FIG. 1, solid arrows represent the relationship "can be a member or can be contained within" while the broken arrows represent "cannot be a member of or be contained within." Furthermore, while upward and horizontal solid directed edges are allowed, no downward directed solid edges are allowed and are not explicitly shown for reason of clarity. A user does not contain other objects, e.g., user 10 in "domain 1" may not contain any other object because users do not contain other objects. Similar considerations apply to the independent users 11 or 12 shown in FIG. 1. Global security group 20 in Domain 1 may contain other global security groups from Domain 1 but not a domain other than domain 1. Thus, the global security group 21 contains the global security group 20 but cannot contain the global security group 22 from Domain 2. Universal security group 30 may be contained in other universal security groups, e.g., universal security group 31. In addition, a universal security group may be contained in a universal security group from another domain. For instance, universal security group 31 from domain 1 contains universal security group 32 from domain 2. A universal security group may also contain other universal security groups, global security groups and users, including those from other domains. Thus, universal security group 31 from domain 1 contains universal security group 32, global security group 22 and user 12 from domain 2. Similarly, user 10 and global security group 20 are contained in universal security group 30.

Domain local security groups may contain users, global security groups and universal security groups, including those from other domains. Thus, domain local security group 40 in domain 1 contains universal security group 30, global security group 20 and user 10 and is contained in domain local security group 41, all from domain 1. In addition domain local security group 41 of domain 1 contains the universal security group 32, global security group 22 and user 12 of domain 2. But a domain local security group cannot contain a domain local security group from another domain as is shown by the broken directed connecting domain local group 41 in domain 1 to the domain local group 42 in domain 2.

Finally, an Access Control List (ACL) for providing a access to a resource, may contain universal security groups global security groups and users from any domain and domain local security groups from its own domain. ACL 50 contains domain local security group 40, universal security group 30, global security group 20 and user 10 of domain 1 while ACL 51 of domain contains universal security group 32, global security group 22 and user 12 of domain 2 but not domain local security group 42.

Figure 2:
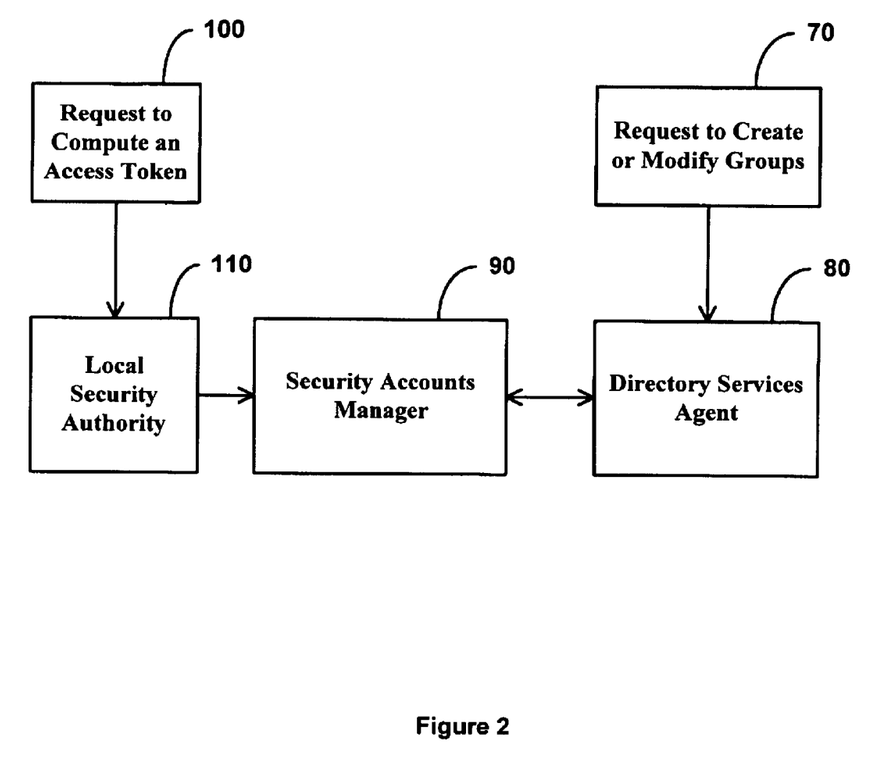
FIG. 2 is a block diagram generally illustrating an exemplary network and the control of requests that involve security concerns.

FIG. 2 presents an overview of the overall security control with the Group definitions as described herein. Requests to Create and Modify Groups 70 enter the Directory Services Agent (DSA) 80. DSA 80 passes these requests to the Security Accounts Manager (SAM) 90 for validation. SAM 90 enforces the group type restrictions. Requests to Compute an Access Token 100 enter the Local Security Authority (LSA) 110. The LSA 110 performs authentication, then calls SAM 90 to perform steps two through four of the algorithm described earlier.

Figure 3:
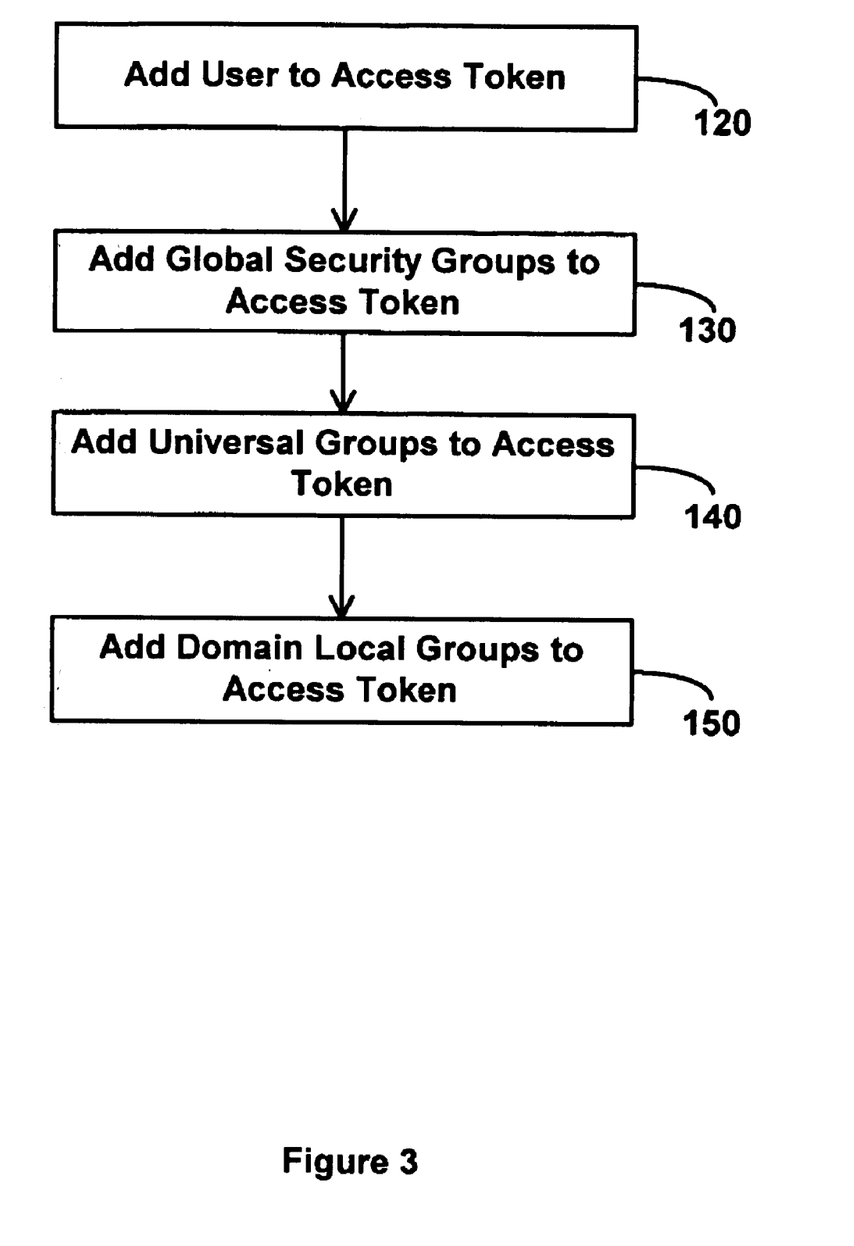
FIG. 3 illustrates a flow diagram detailing the computation of an Access Token in response to a request.

FIG. 3 presents a flow diagram illustrating the previously described steps for calculating the Access Token. The User requesting an Access Token is added to the Access Token (step 120) followed by adding all the Global Security Groups containing any object in the Access Token (step 130) to the Access Token. This step leads to the addition of any Universal Groups from any Domain that contains any object in the Access Token to the Access Token (step 140) and the final step of adding the Domain Local Groups containing any object in the Access Token to complete the construction of the Access Token (step 150).

In other words, in accordance with the invention, groups are enabled as distribution groups and do not appear on an Access Token. However, if the security enabled bit is set then the group is included in a security token for the object. The advantage in this approach is that the group object undergoes a state change without breaking containment relationships. Consequently, there is no need to modify the containing groups if the security bit is set in a contained group, i.e. it is a security group, thus providing simple and integrated administration of groups. This is in contrast to copying from a containing group resulting in breaking containment relationships. In effect, if a putative security principal belongs to a group with the security bit enabled then computation of the Access Token, and in general an access-data-structure, can proceed with the inclusion of the group in the security token.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention.

Those of skill in the art will recognize that all or part of the access token can be cached, with portions of the cache invalidated when security group memberships are added or removed. Rather than computing an entire access token before starting to make an access control determination, the access token can be lazy-evaluated. Access token evaluation amounts to the computation of a transitive closure of a directed graph; the literature contains many optimized algorithms or computing the transitive closure. Therefore, the invention as described herein contemplates all such embodiments as may come within the scope of the following claims and equivalents thereof.

We claim:

1. At a domain controller machine in a first domain of a distributed computing system, the domain controller machine configured from authenticating users in the first domain, a method for constructing and using an access-data-structure by a security principal, belonging to the first domain, to control access to a resource in a second domain of the distributed computing system that is restricted to authorised users, the access-data-structure including a plurality of entries corresponding to security groups, the security groups including a restricted nesting of groups having the security principal as a member and including at least one group controlling access to the resource, the method comprising the steps of:

listing on the access-data-structure, in the domain controller machine in the first domain, an entry corresponding to a security principal;

listing on the access-data-structure, in the domain controller machine in the first domain, additional entries, if any, corresponding to all global security groups wherein at least one member of each of the global security groups corresponds to an entry in the access-data-structure;

listing on the access-data-structure additional entries, if any, corresponding to all universal security groups from any domain wherein at least one of the members of each of the universal security groups corresponds to an entry in the access-data-structure; and verifying the security principal's authorization to access the resource by checking to ensure that at least one entry on the security principal's access-data-structure is present in a list of objects authorized to access the resource.

2. The method of claim 1 further comprising the step of listing on the access-data-structure additional entries, if any, corresponding to all domain local security groups from the second domain wherein at least one member of each of the domain local security groups corresponds to an entry in the access-data-structure.

3. The method of claim 2 wherein, furthermore, the step of listing on the access token an entry corresponding to a domain local security group from the second domain, the domain local security group having as a member as least one other domain local security group from the second domain listed in the access token.

4. The method of claim 2 wherein, furthermore, the step of listing on the access token an entry corresponding to a domain local security group from the second domain, the domain local security group having as a member as least one universal security group from any domain listed in the access token.

5. The method of claim 2 wherein, furthermore, the step of listing on the access token an entry corresponding to a domain local security group from the second domain, the domain local security group having as a member at least one global group from the first domain listed in the access token.

6. The method of claim 2 wherein the resource is in the first domain.

7. The method of claim 1 wherein, furthermore, the step of listing a universal security groups is performed at a domain controller machine in the resource's domain.

8. The method of claim 1 wherein, furthermore, the step of listing in the access token an entry corresponding to a global security group, the global security group having as a member at least one other global security group listed in the access token.

9. The method of claim 1 wherein, furthermore, the step of listing on the access token an entry corresponding to a universal security group from any domain, the universal security group having as a member at least one global security group listed in the access token.

10. The method of claim 1 wherein, furthermore, the step of listing on the access token an entry corresponding to a universal security group from any domain, the universal security group having as a member at least one other universal security group listed in the access token.

11. A distributed computing system for managing access to resources, the distributed computering system including a restricted resource accessible to authorized users from any of a plurality of domains included in the distributed computing system, each domain representing a security boundary of the distributed system, the distributed computing system comprising:

a first entry in an access-data-structure, the first entry corresponding to a security principal;

at least one second entry in the access token, the at least one second entry being a member of at least one of a set consisting of a global security group from the security principal's domain, a universal security group, and a local security group from the resources's domain, wherein the first entry is a member of the second entry;

at least a third entry in the access token, the at least one third entry being a member of at least one of the set consisting of a global security group from the security principal's domain, a universal security group, and a local security group from the resource's domain, wherein at least one of the first and second entry is a member of the third entry, wherein furthermore, no universal security group or domain local security group is a member of a global security group and no domain local group is a member of a universal security group; and means for checking the entries of the access token to ensure that at least one of the entries in the access token is in a list of authorized users for accessing the restricted resource.

12. The system of claim 11 wherein the access token furthermore has an entry corresponding to a second global security group in the domain of the first global security group, wherein the second global security group is a member of a first global security group in the access token.

13. The system of claim 11 wherein the access token furthermore has an entry corresponding to a first global security group, wherein the first global security group is a member of a first universal security group in the access token.

14. The system of claim 11 wherein the access token furthermore has an entry corresponding to a second universal security group, wherein the second universal security group is a member of a first universal security group in the access token.

15. The system of claim 11 wherein the access token furthermore has an entry corresponding to a second domain local security group in the domain of the restricted resource, wherein the second domain local security group is a member of a first domain local security group in the domain of the restricted resource, and the first domain local security group corresponds to an entry in the access token.

16. The system of claim 11 wherein the access token furthermore has an entry corresponding to a first universal security group, wherein the first universal security group is a member of a first domain local security group in the domain of the restricted resource, and the first domain local security group in the domain of the restricted resource is in the access token.

17. The system of claim 11 wherein the access token furthermore has an entry corresponding to a first global security group, wherein the first global security group is a member of a first domain local security group in the domain of the restricted resource in the access token.

18. At a distributed computing system having a plurality of domains, each domain representing a security boundary of the distributed computing system, a computer readable medium having stored thereon an access token corresponding to a security principal in a first domain, the access token for allowing access to a restricted resource in another domain, said first domain having a first domain controller machine for assisting in the construction of the access token, said access token comprising:
  a plurality of entries corresponding to security groups, the plurality of entries a restricted nesting of groups having the security principal as a member and at least one group controlling access to the restricted resource, said plurality of entries including:
    a first entry representing the security principal, and
    a second entry representing a first group from the set consisting of a global security group from the domain of the security principal, a universal security group, and a local security group from a domain of the restricted resource, wherein the first group has at least one member corresponding to an entry in the access token.

19. The access token of claim 18, wherein the first group is a global security group from the domain of the security principal, wherein furthermore, the first group contains a second global security group from the domain of the security principal corresponding to an entry in the access token.

20. The access token of claim 18, wherein the first group is an universal security group, wherein furthermore, the first group contains a first global security group from the domain of the security principal corresponding to an entry in the access token.

21. The access token of claim 18, wherein the first group is a first universal security group, wherein furthermore, the first group contains a second universal group corresponding to an entry in the access token.

22. The access token of claim 18, wherein the first group is an entry corresponding to a first domain local security group from the domain of the restricted resource, which has as member a second doman local security group from the domain of the restricted resource corresponding to an entry in the access token.

23. The access token of claim 18, wherein the first group is a domain local security group from the domain of the restricted resource, wherein the domain local security group from the domain of the restricted resource contains a universal security group corresponding to an entry in the access token.

24. The access token of claim 18 further having a domain local security group from the domain of the restricted resource, the domain local security group from the domain of the restricted resource containing a first global security group corresponding to at least one entry in the access token, the first global security group being from the domain of the security principal.

25. At a domain controller machine in a first domain of a distributed computing system, the domain controller machine configured to authentication users in the first domain, a computer readable medium having computer executable instructions for implementing a method for constructing and using an access token by a security principal, belonging to the first domain, to control access to a resource in a second domain of the distributed computing system that is restricted to authorised users, the access token including a plurality of entries corresponding to security groups, the security group including a restricted nesting of groups having the security principal as a member and at least one group controlling access to the resource, the computer executable instructions implementing the steps of:
  listing on the access token, in the domain controller machine, an entry corresponding to a security principal;
  listing on the access token, in the domain controller machine, additional entries, if any, corresponding to all global security groups wherein at least one member of each of the global security groups corresponds to an entry in the access-data-structure;
  listing on the access token additional entries, if any, corresponding to all universal security groups from any domain wherein at least one of the members of each of the universal security groups corresponds to an entry in the access token; and
  verifying the security principal's authorization to access the resource by checking to ensure that at least one entry on the security principal's access-data-structure is present in a list of objects authorized to access the resource.

26. The computer readable medium of claim 25 having computer executable instructions for carrying out the step of listing on the access token additional entries, if any, corresponding to all domain local security groups from the second domain wherein at least one member of each of the domain local security groups corresponds to an entry in the access token.

27. The computer readable medium of claim 25 wherein the resource is in the first domain.

28. The computer readable medium of claim 26 furthermore having computer executable instructions for executing the step of listing universal security groups at a domain controller machine in the resource's domain.

29. The computer readable medium of claim 26 furthermore having computer executable instructions of executing the step of listing on the access token an entry corresponding to a global security group, the global security group having as a member at least one other global security group listed in the access token step of listing in the access token an entry corresponding to a global security group, the global secrity group having as a member at least one other global security group listed in the access token.

30. The computer readable medium of claim 25 furthermore having computer executable instructions of executing the step of listing on the access token an entry corresponding to a universal security group from any domain, the universal security group having as a member at least one global security group listed in the access token.

31. The computer readable medium of claim 25 furthermore having computer executable instructions for executing the step of listing on the acces token an entry corresponding to a universal security group from any domain, the universal security group having as a member at least one other universal secrity group listed in the access token.

32. The computer readable medium of claim 26 furthermore having computer executable instructions of executing the step of listing in the access token an entry corresponding to a domain local security group from the second domain, the domain local security group having as a member at least one other domain local security group from the second domain listed in the access token.

33. The computer readable medium of claim 26 furthermore having computer executable instructions of executing the step of listing on the access token an entry corresponding to a domain local security group from the second domian, the domain local security group having as a member at least one universal security group from any domain listed in the access token.

34. The computer readable medium of claim 26 furthermore having computer executable instructions of executing the step of listing on the access token an entry corresponding to a domain local security group from the second domain, the domain local security group having as a member at least one global security group from the first domain listed in the access token.

35. At a domain controller machine in a domain of a distributed computing system, the domain controller machine configured to authenticate users in the domain, a method of managing resource access privileges to a restricted resource of the distributed computing system, the distributed computing system having one or more domains including users and resources, each domain of the distributed computing system further including at least one universal group, and wherein at least one group is contained in another group, the method comprising the steps of:

constructing a security token for a security principal, the security token listing a plurality of groups, each group in the plurality of groups having a security flag that is in a first state, and wherein, furthermore, the security token defines access privileges for the security principle;

selecting one of the plurality of groups and toggling the security flag for the selected group to a second state to permit unrestricted access to the one of the plurality of groups; and reconstructing a security token for the security principal, the security token listing a modified plurality of groups, each group in the modified plurality of groups having a security flag that is in the first state whereby the selected group is no longer listed in the security token.

36. The method of claim 35 having furthermore the step of setting, subsequent to the reconstructing step, the security flag for the selected one of the plurality of groups in the first state.

37. The method of claim 35 wherein the security flag is a security bit.

\* \* \* \* \*